United States Patent [19]

Tucker et al.

[11] Patent Number: 5,251,653
[45] Date of Patent: Oct. 12, 1993

[54] CONTROL SYSTEM FOR AUTOMATIC FLUID SHUT-OFF

[76] Inventors: Orrin E. Tucker, 45 Timberline Ct.; Ronald J. Kestermann, 4767 E. Miami River Rd., both of Cleves, Ohio 45002

[21] Appl. No.: 17,619
[22] Filed: Feb. 12, 1993
[51] Int. Cl.[5] .................................. F16K 17/32
[52] U.S. Cl. ............................ 137/460; 137/487.5
[58] Field of Search ................. 137/460, 487.5; 251/30.05, 61.1

[56] References Cited

U.S. PATENT DOCUMENTS

| | | |
|---|---|---|
| 2,675,816 | 4/1954 | Giannette . |
| 2,747,176 | 5/1956 | Cox . |
| 2,767,392 | 10/1956 | Szwargulski . |
| 3,624,627 | 11/1971 | Evans . |
| 3,874,403 | 4/1975 | Fischer . |
| 3,966,088 | 6/1976 | Reynolds . |
| 4,136,823 | 1/1979 | Kullberg . |
| 4,180,088 | 12/1979 | Mallett . |
| 4,297,686 | 10/1981 | Tom . |
| 4,518,955 | 5/1985 | Meyer . |
| 4,796,658 | 1/1989 | Caple . |
| 4,845,472 | 7/1989 | Gordon et al. . |
| 4,901,751 | 2/1990 | Story et al. ............... 137/312 |
| 5,000,224 | 3/1991 | Olson et al. .............. 137/487.5 X |
| 5,007,453 | 4/1991 | Berkowitz et al. ........ 137/487.5 X |
| 5,040,409 | 8/1991 | Kiewit . |
| 5,056,554 | 10/1991 | White . |
| 5,109,884 | 5/1992 | duPlessis ................... 137/460 |
| 5,153,564 | 10/1992 | Hoiberg . |

Primary Examiner—Stephen M. Hepperle
Attorney, Agent, or Firm—Wood, Herron & Evans

[57] ABSTRACT

The invention is directed to a control system for automatically shutting off fluid flow in a fluid system responsive to the detection of leaks or other unwanted fluid flow therein. The system is intended to be relatively inexpensive and easy to install so that it is accessible to homes and business owners of all types. Also, the system is intended to be very accurate and quickly responsive to the detection of a leak to limit fluid loss in the fluid system to thereby minimize any damage.

7 Claims, 1 Drawing Sheet

CONTROL SYSTEM FOR AUTOMATIC FLUID SHUT-OFF

FIELD OF THE INVENTION

This invention is directed to a control system, and more particularly to a control system for automatically shutting off fluid flow in a fluid system responsive to the detection of leaks or other unwanted flow.

BACKGROUND OF THE INVENTION

Fluid leaks, particularly water leaks, in dwelling structures and commercial and industrial facilities account for a significant amount of structural damage and monetary losses on an annual basis. The causes of such leaks are varied and include faulty piping joints; old, worn-out or rusted piping; burst pipes due to temperature fluctuations; and so on. When such leaks occur, it is imperative to shut off the water (or other fluid) supply virtually immediately to prevent catastrophic damage from occurring. When dwelling residents or commercial or industrial facility employees are present, this may be readily accomplished once they perceive the existence of the leak. However, there are many situations in which dwelling residents, etc. are not present or otherwise not available to monitor the situation for an extended period of time (e.g., when they are on vacation, and overnight when occupants are asleep), and thus the existence of a leak may go unnoticed for a considerable period of time during which extensive damage can occur.

Obviously, the main water supply to homes and buildings cannot be turned off and on every time the occupants or employees plan to be away or retire for the evening. Thus, there has been a need for a system which automatically shuts off the flow of water (or other fluid) in a dwelling structure, commercial or industrial facility, responsive to the detection of a fluid leak in that system. A variety of attempts have been made to solve this problem. For example, the following U.S. patents each disclose a system or apparatus for shutting off water flow upon the sensing of a leak: Mallett U.S. Pat. No. 4,180,088; Meyer U.S. Pat. No. 4,518,955; Gordon et al. U.S. Pat. No. 4,845,472; White U.S. Pat. No. 5,056,554.

The systems and apparatus disclosed in the above-referenced patents tend to be quite complicated, some even incorporate computerized controls and/or complex flow sensing devices. For the most part, systems such as those disclosed are likely to be cost prohibitive and preclude installation in many homes, particularly mobile homes wherein substantial water damage occurs annually because the piping used in such homes tends to be more susceptible to leaking than the piping used in other dwelling structures or industrial facilities.

Thus, there continues to be a distinct need for an accurate, relatively compact, inexpensive and easy-to-install system for detecting leaks in a fluid system which automatically shuts off the fluid flow therein responsive to detection of a leak.

SUMMARY OF THE INVENTION

The present invention is directed to a control system for automatically shutting off fluid flow in a fluid system responsive to the detection of unwanted fluid flow therein. The system is intended to be relatively inexpensive and easy to install so that it is accessible to home and business owners of all types. Additionally, the system is intended to be very accurate and quickly responsive to the detection of a leak to limit fluid loss in the fluid system to thereby minimize any damage.

In its broadest aspects, the system comprises a control module which includes a switch for activating the control system; an hydraulic subassembly; and an electronic module which is electrically coupled to both the control module and the hydraulic subassembly for controlling the operation of the hydraulic subassembly. The hydraulic subassembly is designed to be placed in line in a fluid flow path within a fluid system. Typically, the hydraulic subassembly would be placed in the main fluid input line, such as the high pressure water main entering a dwelling or other structure. Since the control module and electronic module are electrically coupled to one another and the electronic module is in turn electrically coupled to the hydraulic subassembly, it is not necessary for the control and electronic modules to be located directly adjacent the hydraulic subassembly, nor directly adjacent one another. Thus, since the water main to most homes and other dwellings is typically not in the most convenient location, it is contemplated that the control module and/or the electronic module would be placed in an easily accessible, and highly visible location for the occupants of the dwelling.

In one embodiment, the hydraulic subassembly includes a three-way pilot valve for directing fluid flow within the hydraulic subassembly; this is the first component sequentially in the fluid flow path. Downstream of the pilot valve is a flow meter/sensor which detects unwanted fluid flow in the fluid system when the control system is activated. Relatively sensitive flow meters which detect flow at a rate as low as approximately one gallon per minute (gpm) are preferably utilized in the system of the present invention. Downstream of the flow meter is a diaphragm valve which physically shuts off the fluid flow within the fluid system. The diaphragm valve is actuated by the three-way pilot valve, which is in turn activated by the electronic module in response to detection of unwanted fluid flow by the flow meter.

In operation, the system is activated or "armed" by turning on the power by means of a switch on the control module. At this point, the system is in its normal flow-monitoring mode and the diaphragm valve is open. Since the control system of the present invention is primarily intended to be used when no fluid flow is expected, any fluid flow in the fluid system is monitored and detected by the flow sensor. If the preset flow threshold of the flow sensor is exceeded, the flow sensor activates the three-way pilot valve which in turn closes the diaphragm valve, thereby shutting off all water flow in the system.

The control system may also preferably include a reset switch in the control module for resetting the system subsequent to the detection and correction of a leak. Additionally, the control module may include a light which indicates when the system is activated and a second light which indicates when fluid flow in the system has been shut off, thereby readily informing persons using the system of its operational status. Finally, the hydraulic assembly may include a check valve located in the fluid flow path between the three-way pilot valve and the flow sensor to prevent excessive back flow in the fluid system when fluid flow has been shut off. It will be appreciated that check valves for this purpose may be incorporated in the fluid system at locations remote from the hydraulic system to prevent back flow and drainage of fluid at the leak location.

It is contemplated that the system of the present invention can be designed for remote activation. Additionally, it is contemplated that the system can be linked to a security alarm system and even utilize a common control panel. It will be appreciated that the control system of the present invention is equally applicable for use in homes, mobile homes, apartment buildings, condominiums, businesses, and commercial and industrial facilities, since all of the above have a fluid flow system in which it is desirable to detect unwanted fluid flow and shut off fluid flow responsive to the detection of a leak. Thus, although the foregoing and the following detailed description, which are specifically directed to an embodiment of the invention which is particularly suitable for use in the water flow system of a home, the invention is not intended to be so limited.

These and other features and advantages of the present invention will become apparent to persons skilled in the art upon reading the following detailed description in conjunction with the drawings.

DETAILED DESCRIPTION OF THE DRAWINGS

Figure 1:
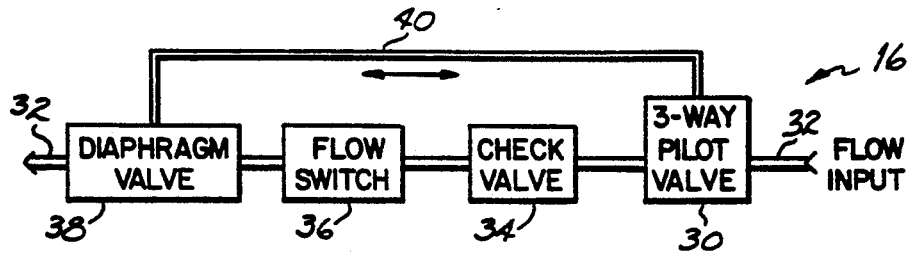
FIG. 1 is a schematic representation of one embodiment of the hydraulic subassembly portion of the present invention.
Figure 2:
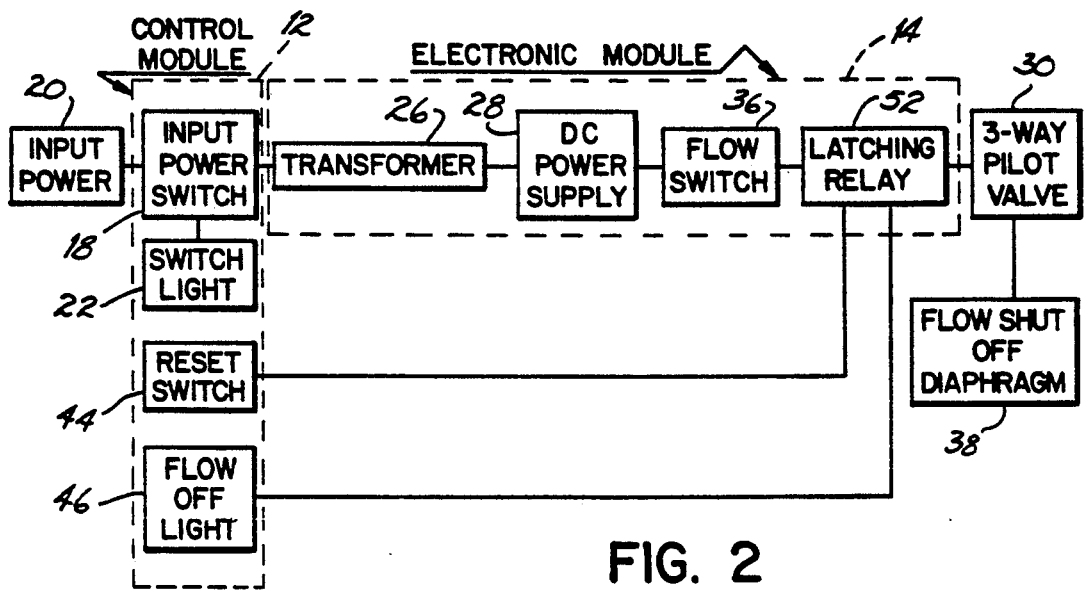
FIG. 2 is a schematic representation of one embodiment of the control module and electronic module portions of the present invention.
Figure 3:
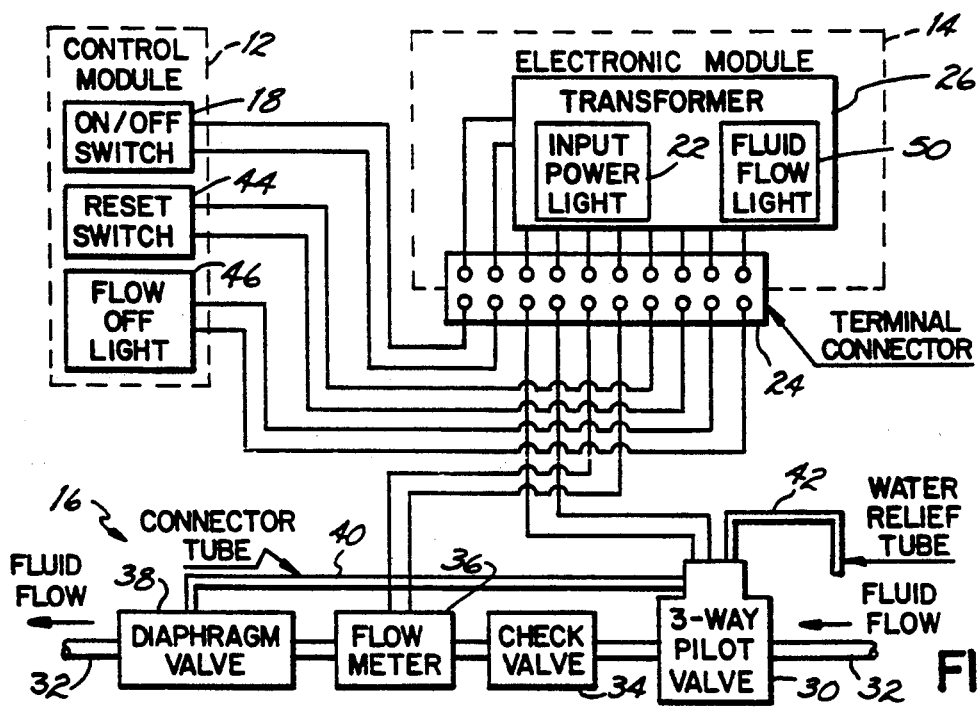
FIG. 3 is a schematic representation of a preferred embodiment of the control system of the present invention.

FIG. 3 is an overall schematic representation of a preferred embodiment of a control system 10 of the present invention. As shown, control system 10 generally comprises a control module 12, an electronic module 14 and an hydraulic subassembly 16. FIG. 1 is a schematic representation of a preferred hydraulic subassembly 16, while FIG. 2 is a schematic representation of preferred control module 12 and electronic module 14.

With specific reference to FIGS. 2 and 3, control module 12 includes an ON/OFF input power switch 18 for activation of control system 10. Switch 18 is electrically connected to an input power supply, designated generally as 20, which may be any suitable power supply such as the typical 120 volts AC household current. The control module preferably further includes an indicator light 22 which is illuminated when the control system 10 is activated. The input power switch is electrically coupled via a 20-point terminal connector 24 to a transformer 26 which steps down the input power from 120 volts AC preferably to 24 volts AC. Transformer 26 itself is electrically coupled to a DC power supply 28 which supplies direct current to power various components of the system.

Control system 10 of the present invention is designed to be placed in the fluid flow path of a fluid system (not shown) so that fluid flows through hydraulic subassembly 16 as represented by the arrows in FIGS. 1 and 3. Fluid flow is input to the three-way pilot valve 30 via flow conduit 32. Preferably, hydraulic system 16 further includes a check valve 34 downstream of three-way pilot valve 30 and ahead of flow meter 36. Check valve 34 is intended to prevent excessive back flow within the fluid system upon the detection of a leak and subsequent to shutting off of fluid flow therein. Finally, a diaphragm valve 38 is located downstream of flow meter 36. Fluid flow through diaphragm valve 38 continues in conduit 32 to the remainder of the fluid system within the dwelling structure.

With reference to FIGS. 1 and 3, diaphragm valve 38 and three-way pilot valve 30 are in fluidic communication via connector tube 40, through which fluid can flow in either direction, as represented by the double-headed arrow in FIG. 1. There is no flow in connector tube 40 when system 10 is not activated. Additionally, three-way pilot valve 30 is provided with a water relief tube 42 for a purpose to be described below. Finally, control module 12 preferably also includes a reset switch 44 and a "flow off" light 46 which indicates when the control system has shut off fluid flow.

It will be appreciated that the system of the present invention can be easily manufactured utilizing off-the-shelf electronic, mechanical and hydraulic components. In accordance with a preferred embodiment of the system of the present invention, the following components have proved to be suitable. 24 volt three-way valves available from Bermad Inc. of Anaheim, Calif., and 200 series diaphragm valves also available from Bermad Inc. Suitable check valves are available from The Snow Valve Co., and one suitable flow meter/sensor is the Q-12 DS/6M flow meter available from Harwil Corp. of Long Beach, Calif. In connection with the present invention, it has been determined that DC power supply 28 can be dispensed with, but doing so would require utilizing a different type of flow sensor which is compatible with AC current.

Having thus described the components of a preferred embodiment of control system 10 of the present invention, the details of the operation thereof will now be described.

System 10 is activated by placing power switch 18 in the "ON" position. This supplies input power through transformer 26 to DC power supply 28, which in turn powers flow meter 36. At this point, lamp indicator 22 (input power light) and both lamp indicators 46 and 50 (fluid flow off lights) are illuminated, and, thus, the system is "armed". Reset button or switch 44 is then depressed and the "flow off" lights 46 and 50 should go off. System 10 is now in its leak-detection mode, with diaphragm valve 38 open to permit fluid flow through the system. Flow meter 36, which preferably has a preset flow threshold limit on the order of one gallon per minute, monitors flow in the fluid system.

Control system 10 is intended to be armed and operational during periods when no fluid flow in the system is expected, i.e., at night or while dwelling occupants are away. Thus, under normal circumstances, there should be no fluid flow detectable by system 10. However, certain events are contemplated which may occur even during such periods when occupants are away or asleep. For example, an automatic icemaker in a refrigerator/freezer will draw water in the fluid system, as will the automatic refilling of a humidifier pan. The system is designed so that neither of these events, nor a very slow dripping faucet, will cause control system 10 to shut off water flow, since the preset one gallon per minute threshold of the flow sensor will not be exceeded. If desired, a more sensitive flow meter can be utilized which will cause fluid shut off even upon the occurrence of the above events.

When system 10 is not activated, fluid flows through three-way pilot valve 30, check valve 34, flow meter 36 and diaphragm valve 38. Once the system has been "armed" and when the detected flow rate exceeds the preset limit of flow meter 36, as will occur when a leak develops, the flow meter sends an electronic signal via terminal connector 24 to a latching relay 52, which in turn sends an electronic signal to three-way pilot valve 30. Pilot valve 30 includes an electrically activated solenoid (not shown) which is responsive to the electric signal originating from flow meter 36 and diverts fluid through connector tube 40 to exert pressure on diaphragm valve 38, thus actuating the diaphragm valve to shut off all fluid flow within the system. When diaphragm valve 38 closes and fluid flow is stopped, the indicator lights 46 and 50 on the control module 12 and electronic module 14, respectively, are illuminated Thus, when the dwelling occupant returns and visually interrogates the control or electronic module, these lights indicate that unwanted fluid flow was detected and the system shut off all fluid flow in the system in response thereto. The owner can then investigate the source of unwanted fluid flow and remedy any leak or other problem which may have developed and caused the fluid flow shut off.

Once the leak or other problem has been fixed, the system is reset by depressing reset switch 44. Depressing reset switch 44 causes the diaphragm valve to open and allow an incremental amount of fluid flow in the system. A small amount of water is ejected through relief tube 42 when reset switch 44 is depressed to relieve pressure in connector tube 40. Since any leak in the system will have caused a loss of fluid therein, an equal volume of replacement fluid must be placed in the system. Thus, fluid flows through the diaphragm valve and into the system to replace the fluid which was lost through the leak. However, since the flow meter will be monitoring this replacement fluid flow, it may detect flow which exceeds its preset limit and thereby shut the system flow off. Thus, it may be necessary to depress the reset switch multiple times in order to fully replenish the volume of lost fluid in the system. Once this has been accomplished, and no further flow through the flow meter is required, the diaphragm valve will remain open and "flow off" lights 46, 50 will go off. If the water leak was not remedied, then depressing reset switch over and over will never accomplish the replacement of lost fluid in the system and the "flow off" indicator lights will never go off.

Thus, reset switch 44 provides an easy means by which the system can be re-activated after a fluid drain on the system causes the system to shut off water flow. For example, if system 10 is activated for overnight use and detection, and a faucet is opened or a toilet flushed, the system will read this as an unwanted fluid flow within the system and water flow will be shut off according to the operation of the system described hereinabove. Since there was not actually a leak, the system is re-armed by depressing the reset switch an appropriate number of times to replenish the volume of water drained from the system.

System 10 can also be used as a simple, reliable means to shut off water flow so that routine maintenance work such as repairing dripping faucets, toilets, or any other water dependent fixture can be performed. This is accomplished by "arming" the system, and then opening any water outlet such as a faucet. Water flow will be shut off and remain off by operation of system 10 as described herein. Repairs can then be made and checked for leaks by re-arming the system. This function is especially useful for persons who may not know where to shut off the main supply of water, or when the main valve is inoperable due to non-use, or is corroded, etc. This is also a quick and easy way for persons not skilled in "do-it-yourself" work to shut off the supply of water if the system 10 is not in use and someone is home and notices a leak has occurred.

While the present invention has been described herein with reference to a preferred embodiment, as shown in the drawings, it will be appreciated by persons skilled in the art that various modifications can be made without departing from the spirit and scope of the present invention, as defined by the appended claims.

What is claimed is:

1. A control system for automatically shutting off fluid flow in a fluid system responsive to detection of unwanted fluid flow therein, said system comprising:

a control module which includes means for activating said control system;

a hydraulic subassembly; and an electronic module electrically coupled to both said control module and said hydraulic subassembly for controlling the operation of said hydraulic subassembly;

said hydraulic subassembly adapted to be placed in a fluid flow path within said fluid system and to shut off fluid flow therein responsive to detection of unwanted fluid flow in said fluid system, said hydraulic subassembly including:

(a) a three-way pilot valve for directing fluid flow within said hydraulic subassembly;

(b) a flow meter for detecting unwanted fluid flow in said fluid system; and (c) a diaphragm valve for shutting off fluid flow in said fluid system, said diaphragm valve actuated by said three-way pilot valve, which is in turn activated by said electronic module in response to the detection of unwanted fluid flow by said flow meter.

2. A control system of claim 1, said control module further including means for resetting said control system subsequent to the detection and correction of a leak in said fluid system.

3. A control system of claim 1, said control module further including means for indicating when said control system has been activated and means for indicating when fluid flow in said fluid system has been shut off.

4. A control system of claim 1, said electronic module including a transformer electrically coupled to both said activating means of said control module and said flow meter.

5. A control system of claim 4, said electronic module further including a DC power supply electrically coupled to said transformer and said flow meter for supplying power to said flow meter.

6. A control system of claim 4, said electronic module further including a latching relay coupled to said flow meter and said three-way pilot valve.

7. A control system of claim 1, said hydraulic subassembly further including a check valve disposed in said fluid flow path to prevent excessive back flow in said fluid system subsequent to the shutting off of said fluid flow.

* * * * *